United States Patent [19]
Haegeman

[11] Patent Number: 5,564,828
[45] Date of Patent: Oct. 15, 1996

[54] METHOD AND DEVICE FOR CONTROLLED MOTION OF WATER IN WATER BASINS

[76] Inventor: Johny H. Haegeman, Victor Baetensstraat 15, B-1500 Halle, Belgium

[21] Appl. No.: 575,093

[22] Filed: Dec. 19, 1995

Related U.S. Application Data

[63] Continuation of Ser. No. 198,281, Feb. 18, 1994, abandoned.

[30] Foreign Application Priority Data

Feb. 24, 1993 [DE] Germany .............................. 09300172

[51] Int. Cl.$^6$ ...................................................... B01F 5/12
[52] U.S. Cl. ............................ 366/263; 366/262; 366/270
[58] Field of Search ...................................... 366/241, 242, 366/244, 245, 247, 249–253, 262–264, 266, 270

[56] References Cited

U.S. PATENT DOCUMENTS

| | | | |
|---|---|---|---|
| 1,255,944 | 2/1918 | Stevens | 366/270 |
| 2,530,814 | 11/1950 | De Becze | 366/263 |
| 3,218,042 | 11/1965 | Ciabattari et al. | 259/95 |
| 3,524,629 | 8/1970 | Culwell | 366/263 |
| 3,606,273 | 9/1971 | Johnson | 366/263 |
| 3,814,395 | 6/1974 | Kaelin | 261/87 |
| 4,008,882 | 2/1977 | Jorgensen | 366/263 |
| 4,422,771 | 12/1983 | Earhart | 366/251 |
| 4,871,448 | 10/1989 | Dobryakov | 366/270 |
| 4,981,366 | 1/1991 | Wickoren | 366/262 |

FOREIGN PATENT DOCUMENTS

| | | | |
|---|---|---|---|
| 0366644A1 | 5/1990 | Belgium . | |
| 22603 | 11/1956 | Germany | 366/262 |
| 3418742A1 | 11/1985 | Germany . | |
| 314316 | 7/1956 | Switzerland . | |
| 1005871 | 3/1988 | U.S.S.R. | 366/241 |

*Primary Examiner*—David Scherbel
*Assistant Examiner*—Terrence R. Till
*Attorney, Agent, or Firm*—Leonard Bloom

[57] ABSTRACT

Device for aerating and/or mixing water in a basin, using a means to impart a rotational motion to the water and having guide means (57) which convert the rotational motion into a combined horizontal and vertical motion of the water. Said guide means can be screw-shaped or plate-shaped elements of suitable shape and dimensions.

15 Claims, 9 Drawing Sheets

METHOD AND DEVICE FOR CONTROLLED MOTION OF WATER IN WATER BASINS

DESCRIPTION

This application is a continuation of application Ser. No. 08/198,281, filed Feb. 18, 1994 now abandoned.

This invention concerns a method and a device for controlling the water motion in water basins and in particular in waste water basins.

Aerators and/or mixers of various types have been described by the applicant in various documents. For example, Belgian patent 884.216 describes an aerator consisting of a power source mounted on a float and driving a shaft to which is attached a stirring organ consisting of a propeller with fixed or rotating diffusion head. According to another embodiment (Belgian patent 893,687), the stirring organ consists of a combined impeller organ, consisting of a centrifugal impeller and a screw (screw pump).

According to Belgian patent 88.01233 (publication 1002575A5), the device is equipped with a second float, and the degree of submersion can be altered so that the device can be used either as an aerator or as a mixer.

Surface aerators with a screw wheel or impeller organ normally make use of a suction cone without any guidance system, in order to lead the water to the pump housing.

Since in addition to giving an upwards motion to the water sucked in, the impeller also gives the water a rotation motion in the pump housing, a vortex is freely induced underneath said suction cone. This vortex propagates itself as a result of friction between the different liquid layers, finally giving a horizontal rotation motion (FIG. 1) to the entire basin. This favourably influences the mixing of the bottom layer, but the exchange between the oxygen-rich surface layer and the bottom layer is insufficient, so that the oxygen input performance is negatively influenced.

Figure 2:
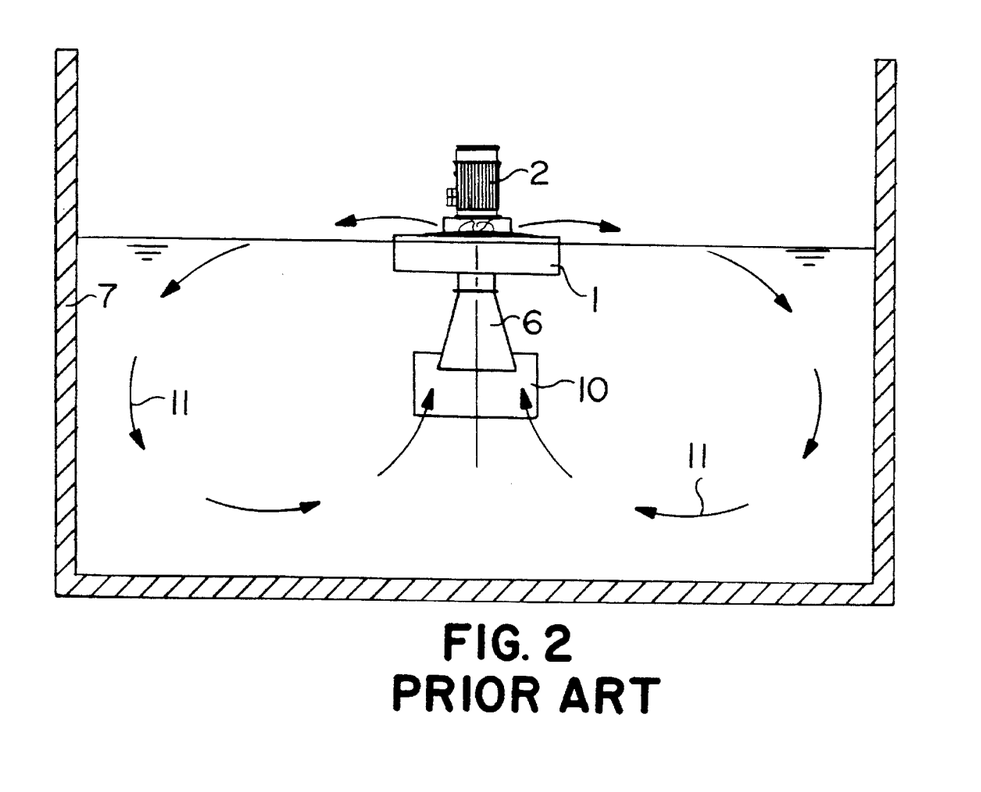
FIG. 2: diagram of the same aerator, showing the vertical rotational motion of the water.

For this reason, a cross is placed underneath the suction cone, consisting of one or more flat, vertical plates. Under the influence of this cross, a rotation motion is given to the water in each vertical plane through the vertical axis of the aerator, extending from the aerator to the wall, then to the bottom and back to the aerator (FIG. 2). This gives maximum renewal of the surface and thus maximum oxygen input. However, the horizontal rotation motion which the vortex gives to the water in the basin is almost lost, so that mixing of the bottom layer is reduced. Since the horizontal motion is disturbed, the liquid must rise steeply from the bottom back to the device under the influence of the suction force, with the result that precipitable components—such as active sludge—cannot follow this motion completely, so that there is settling on the bottom. The input of oxygen is maximum, but it is not transferred efficiently to the active sludge, because the latter partially settles.

From the above it can be seen that aerators and/or mixers either give good mixing but have problems with oxygen transfer, or achieve good oxygen transfer by means of a cross but give insufficient mixing.

The aim of this invention is to provide aerators and/or mixers that give both good mixing and good oxygen transfer. In order to achieve this aim, according to the invention means are attached which allow the horizontal and vertical rotation motion to be combined to achieve a controlled and directed flow in the basin.

Surprisingly, it is found that when the cross which normally consists of flat, vertical plates is replaced by a cross with angled plates, a combined rotational motion of the water is obtained. More generally, this combined motion can also be obtained when guide means are attached on the device.

Said guide means preferably consist of screw-shaped guide elements, or of several plates fixed at a suitable angle.

According to a preferred embodiment, screw-shaped guide elements are used, consisting of one or more vanes or flights whose pitch, diameter and number of revolutions can all be freely determined. Said parameters will be chosen by the man skilled in the art, in accordance with the power of the device and the dimensions of the basin.

It is also possible to have a variable pitch and/or variable diameter of the vanes. Said screw-shaped guide elements can be placed in or round the suction cone, if existing. In the case of devices without pump housing, the guide elements can be placed round the impeller organ.

According to another advantageous embodiment of the invention, the guide elements consist of plates mounted at an appropriate angle with respect to the aerators, with curved plates preferably being used; however, these plates can also be flat. In order to achieve maximum guidance, the shape and dimensions of the plates will be chosen by the man skilled in the art, according to the type of device, its power and the size of the basin.

The plates can have any desired shape, and be mounted at any desired place on the device.

The invention is described below in more detail, with the help of a series of non-limitative examples, with reference to the accompanying drawings, which represent the following.

Figure 1:
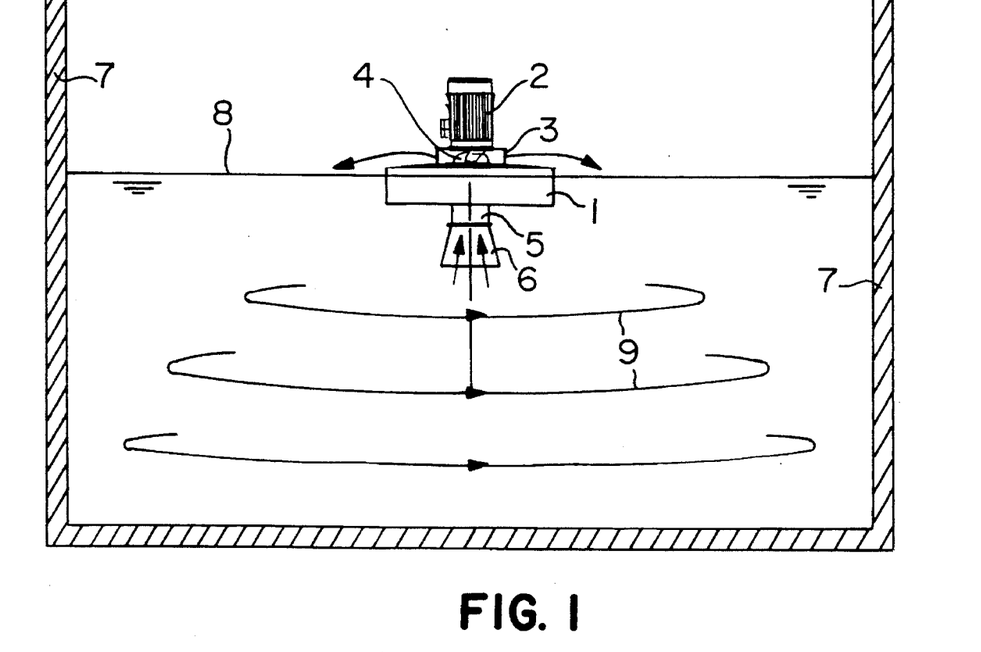
FIG. 1: diagram of an aerator with an impeller organ, showing the horizontal rotational motion of the water.

With reference to FIG. 1, this shows an aerator with centrifugal screw impeller. The aerator consists of a float 1 on which a motor 2 is mounted by means of an intervening flange 3, with the shaft of the motor driving a centrifugal screw impeller 4 which is surrounded by a pump housing 5; a suction cone 6 is mounted underneath the pump housing. This aerator is located in a basin 7 with water surface 8. As a result of the centrifugal screw impeller rotation, the water is sucked up through the cone and distributed over the water surface 8 via the centrifugal part of the impeller screw. The water sucked up is given a rotational motion by the impeller, creating a vortex underneath the cone, and through friction giving a horizontal rotation motion (arrows 9) to the water in the entire basin.

According to prior art (FIG. 2), a cross 10 with vertical surfaces is mounted underneath the cone 6, so that the rotational motion of the water in the basin becomes vertical (arrows 11).

Figure 3:
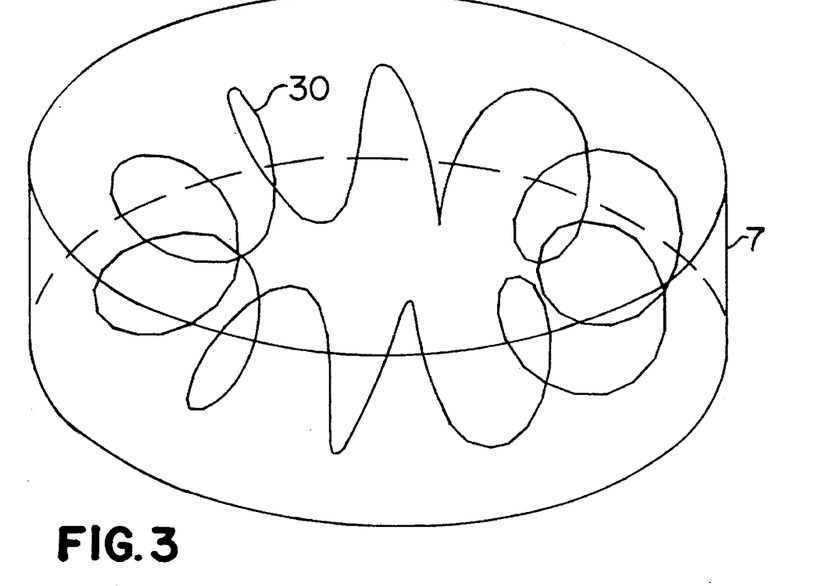
FIG. 3: diagram of the rotational motion obtained according to the invention.

The rotation motion obtained by the invention can be represented by the curve 30 in FIG. 3, representing a combined horizontal and vertical motion—also known as a waltzing or roller motion in the shape of a toroidal helix—of the water in the basin 7.

This waltzing motion is obtained by means of a screw-shaped or plate-shaped guide.

In order to simplify the explanation, the guides in FIGS. 4 to 25 are described as applied with a device of the type described in FIG. 1.

Figure 4:
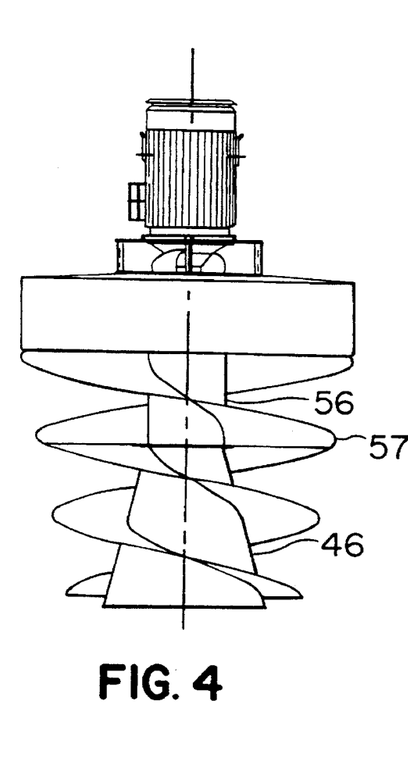
FIGS. 4 and 5: schematic view of two embodiments with a screw-shaped guide mounted round the suction cone and pump housing of an aerator with centrifugal screw impeller.

FIG. 4 shows an apparatus with a double-threaded, screw-shaped guide 57 with varying diameter, located round the pump housing 56 and the cone 46. Such a screw-shaped guide can of course also be single-threaded or have a constant diameter, or have a varying diameter which increases or decreases from top to bottom, or which continues below the cone or can be placed only round the cone or only partly round the cone.

Figure 5:
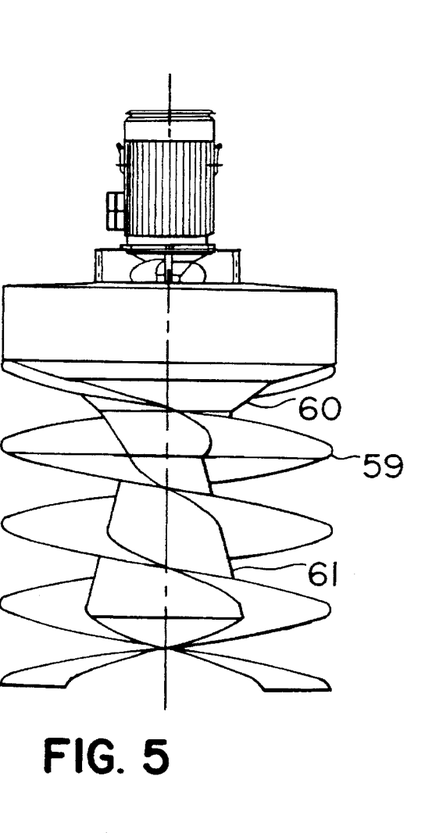

FIG. 5 shows a device in which the bottom side of the float (60) is cone-shaped and in which the screw-shaped guide 59 is double-threaded with constant diameter and continues below the cone 61.

Figure 6A:
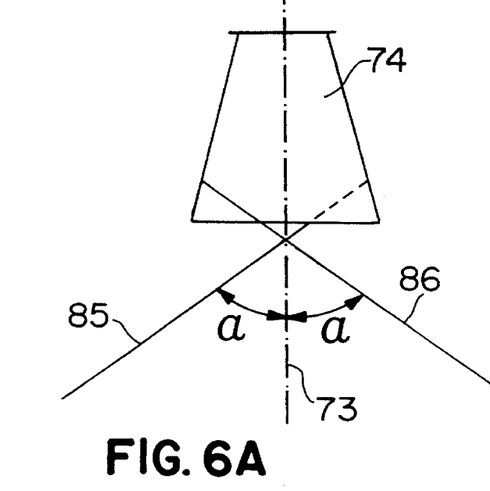
FIGS. 6 to 8: schematic view (with underneath view in FIGS. 6 and 7) of a plate-shaped guide on the outside of the suction cone of the aerator.
Figure 6B:
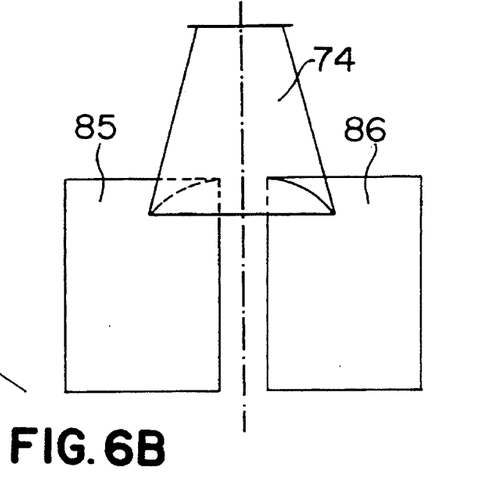
Figure 6C:
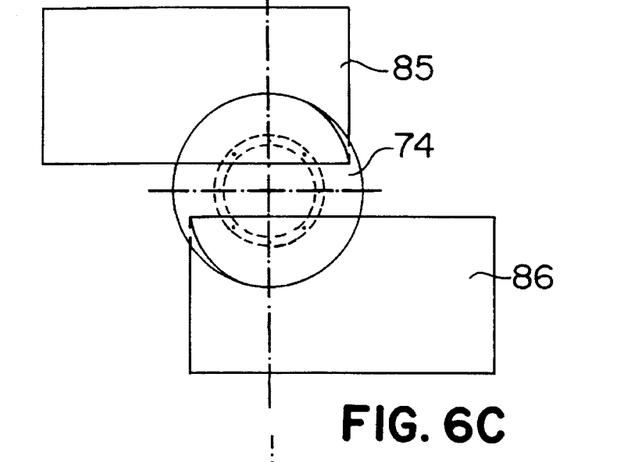

FIGS. 6 show flat plates 85 and 86 making the same angle α with the axis of the cone 74, but placed opposite each other underneath the cone 74. FIG. 6a shows a front view, FIG. 6b a side view and FIG. 6c a bottom view.

Figure 7A:
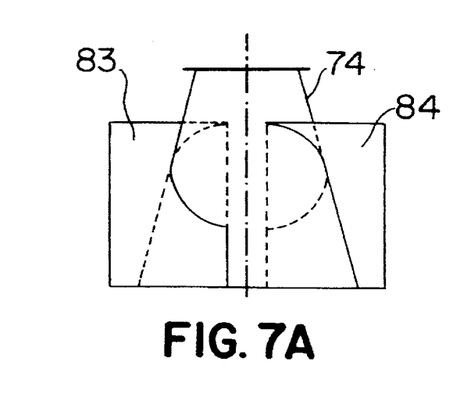
Figure 7B:
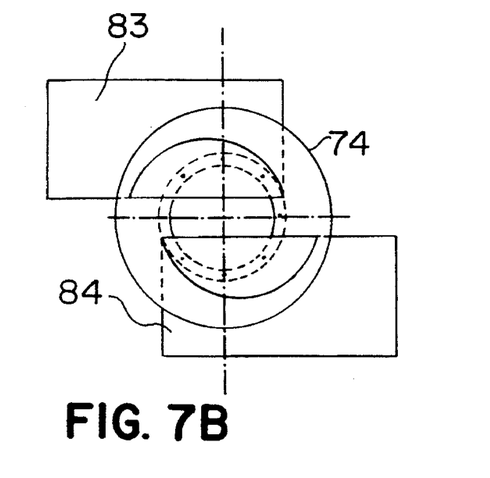

FIGS. 7 show two flat plates 83 and 84 making the same angle with the axis of the cone 74, but positioned opposite each other, around the cone 74. FIG. 7a shows a side view and FIG. 7b a bottom view.

Figure 8:
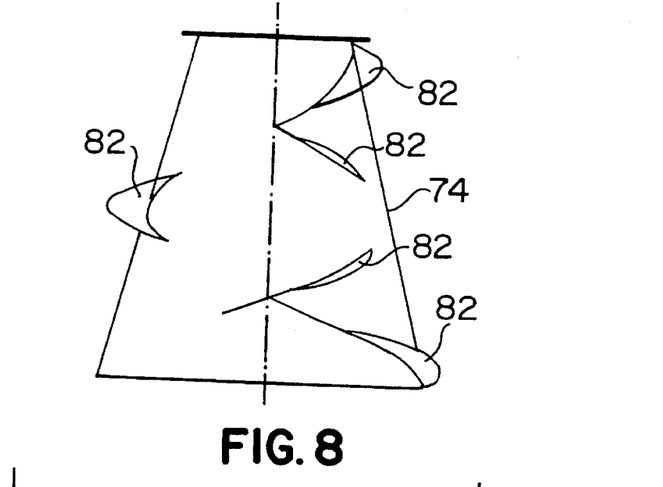

FIG. 8 shows five screw-shaped plates 82 of different dimensions and mounted at different heights round the suction cone 74.

Figure 9A:
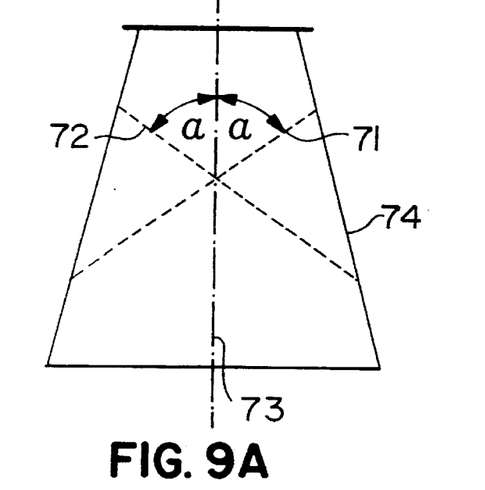
FIG. 9: front and side view and an underneath view of a plate-shaped guide in the suction cone of an aerator.
Figure 9B:
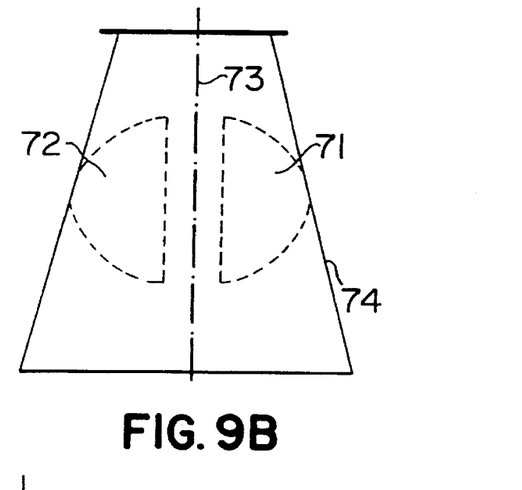
Figure 9C:
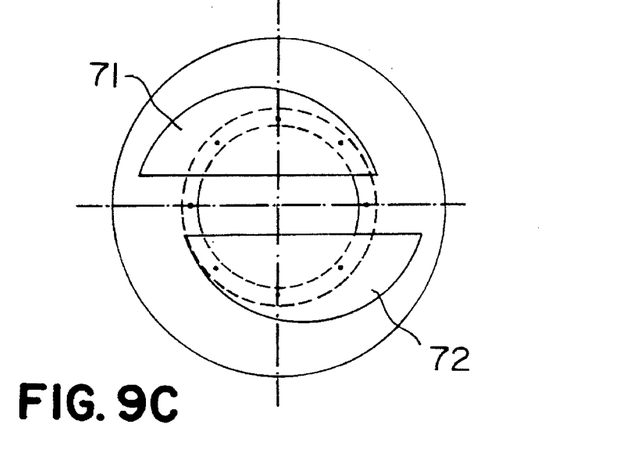

FIGS. 9 show two flat plates 71 and 72 in the form of a half oval, making the same angle α with the axis 73 of the cone 74 of the device, but positioned opposite each other. FIG. 9a shows a side view, FIG. 9b a front view and FIG. 9c a bottom view.

Figure 10:
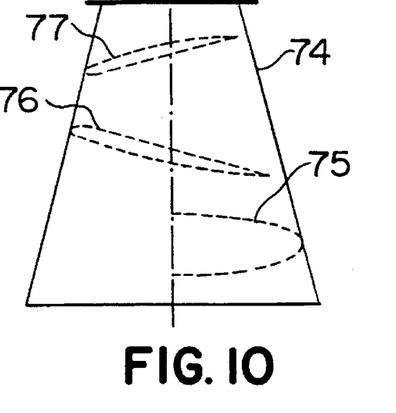
FIGS. 10 and 11: schematic views of a plate-shaped guide on the inside of the suction cone.

FIG. 10 shows three flat plates 75, 76 and 77 mounted in the cone 74 at the same angle to the axis but rotated 120° with respect to each other.

Figure 11:
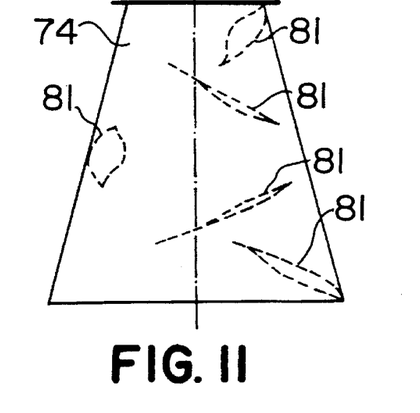

FIG. 11 shows five screw-shaped plates 81 of different dimensions and mounted at different heights in the suction cone 74.

Figure 12:
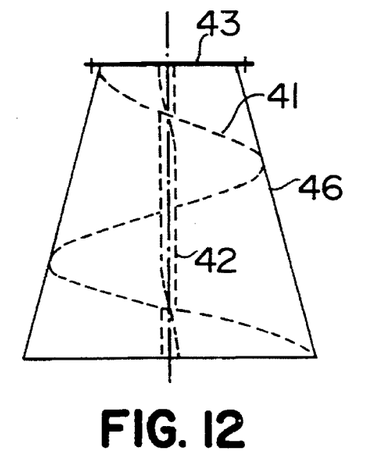
FIGS. 12 to 18: schematic views of different embodiments of a screw-shaped guide mounted in the suction cone of an aerator with centrifugal screw impeller.

FIG. 12 shows a single-threaded screw 41 with varying diameter, mounted round a tube 42 in the cone 46 of the device and attached to the top collar 43 of the cone.

Figure 13:
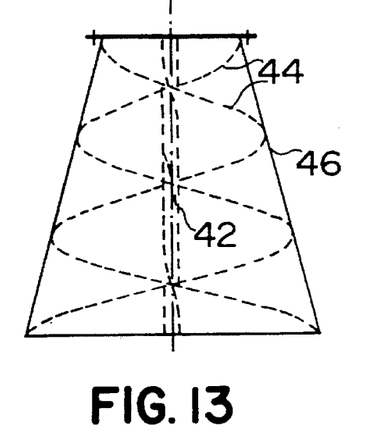
Figure 14:
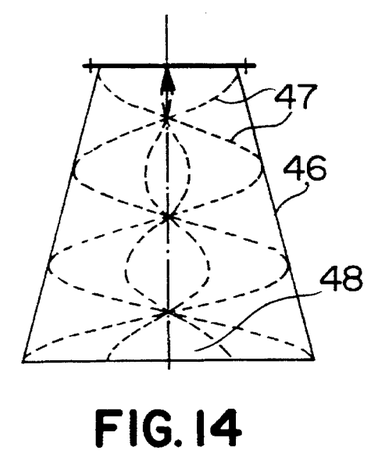
Figure 15:
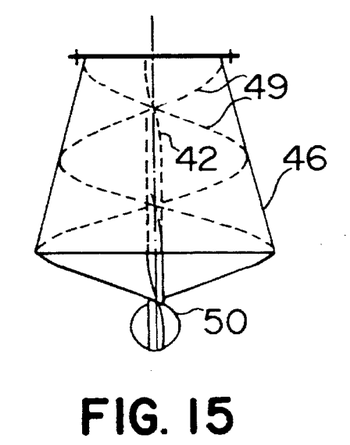

FIG. 13 shows a double-threaded screw 44 with varying diameter, located round a tube 42 in the cone 46 of the device; FIG. 14 shows a double-threaded screw 47 with varying diameter, open in the middle 48, located in the cone 46 of the device; FIG. 15 shows a double-threaded screw 49 with varying diameter, located round a tube 42, with the screw running partly underneath the cone 46 and ending in a part with small diameter. The part of the screw underneath the cone is indicated in the drawing by reference number 50.

Figure 16:
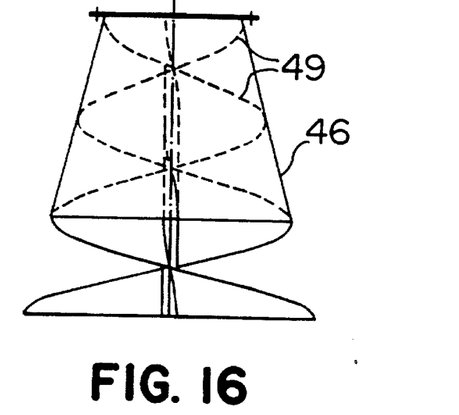
Figure 17:
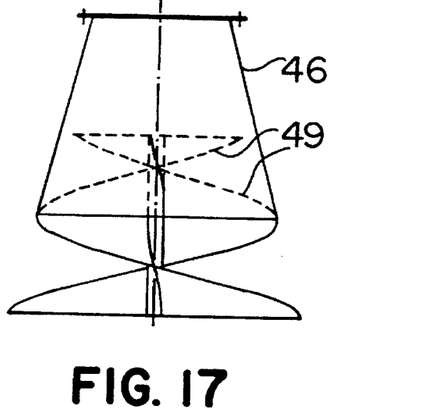
Figure 18:
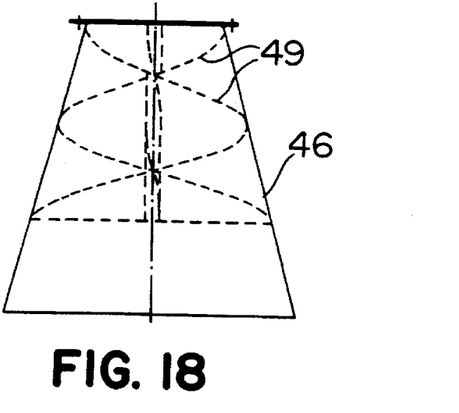

FIGS. 16, 17 and 18 show variants of the example described in FIG. 15. In FIG. 16, the screw 49 simply continues underneath the cone 46 with a constant variation in diameter. In FIG. 17 the screw 49 begins approximately half way down the cone, and in FIG. 18 the screw 49 ends approximately half way down the cone 46.

Figure 19:
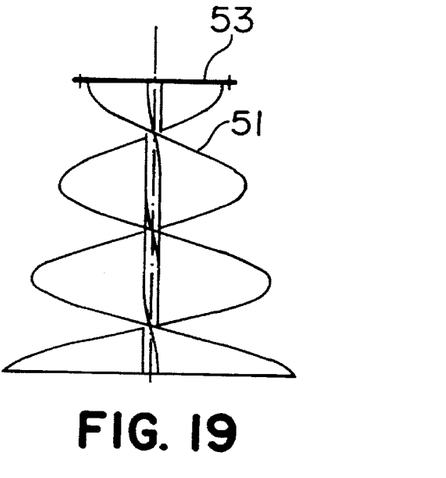
FIGS. 19 and 20: schematic view of two embodiments of a screw-shaped guide mounted underneath the pump housing of an aerator without suction cone.
Figure 20:
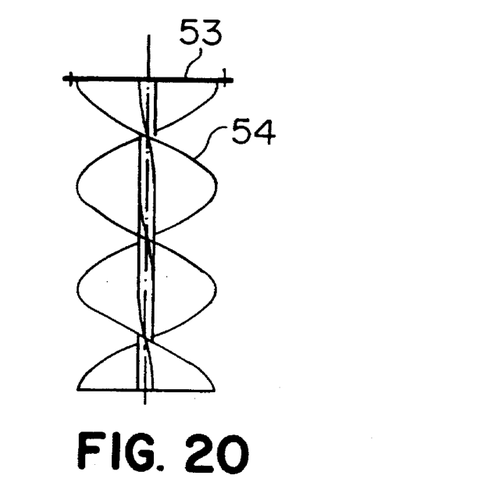

FIGS. 19 and 20 show a screw mounted underneath the pump housing 5 of the device, where the device does not have a cone.

FIG. 19 shows a double-threaded screw 51 with variable diameter, attached to a collar 53 mounted underneath the pump housing (not shown).

In FIG. 20, the screw is a double-threaded screw 54 with constant diameter.

Figure 21:
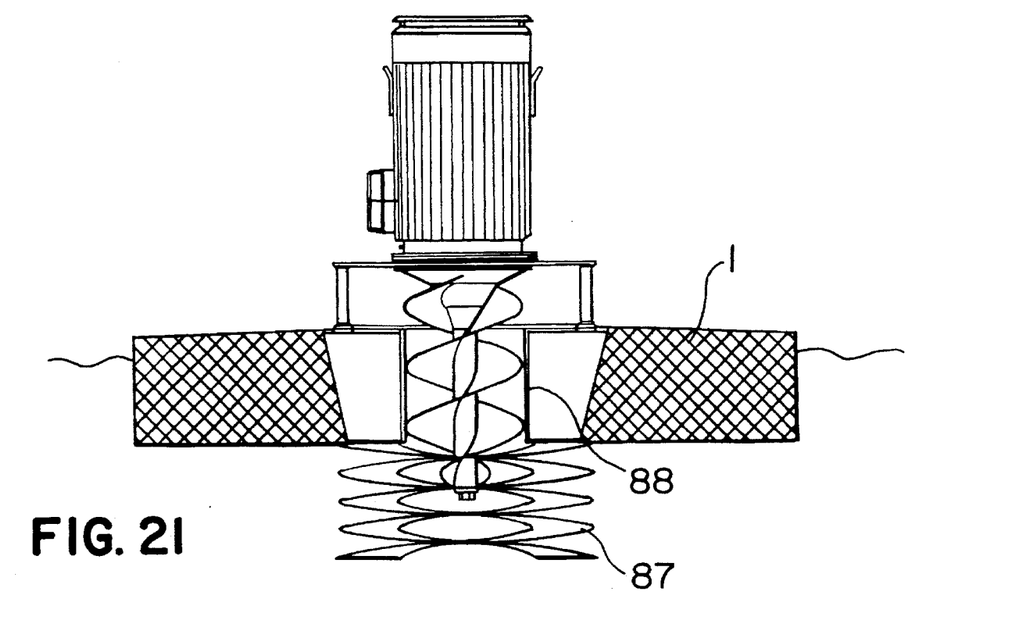
FIGS. 21 to 24: views of four other variants with screw-shaped guide applied in FIGS. 21 and 22 in the case of an aerator with a partial pump housing, and in FIGS. 23 and 24 in the case of an aerator without pump housing.

FIG. 21 shows a device with a double-threaded, screw-shaped guide 87 underneath the pump housing 88 of an aerator in which the pump housing is only partially present and has height equal to the height of the float 1.

Figure 22:
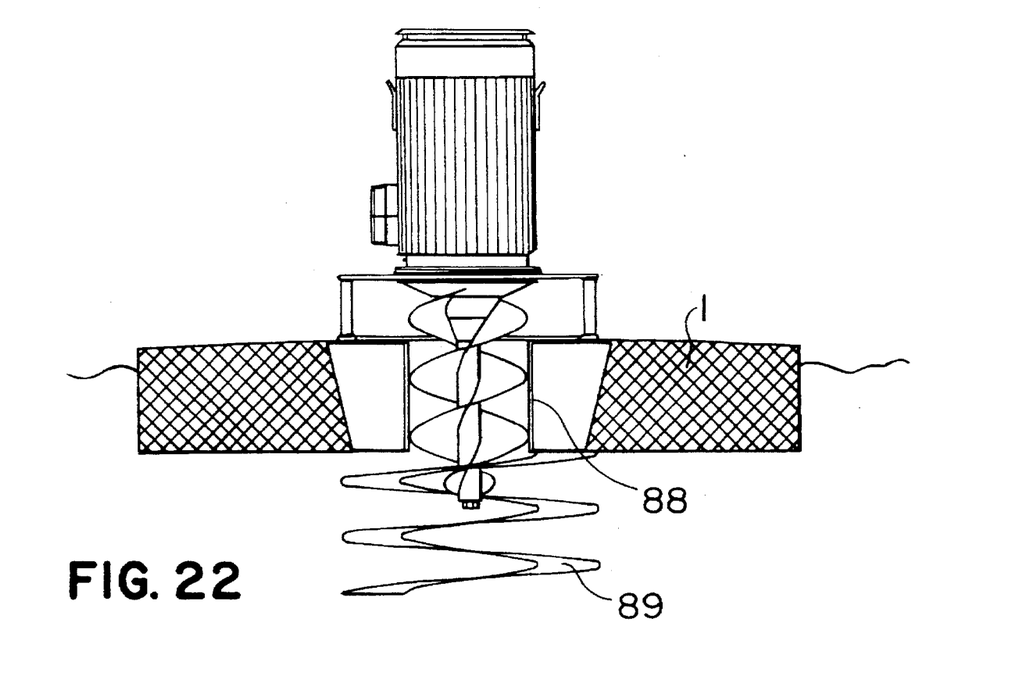

FIG. 22 is a variant of FIG. 21, in which the guide 89 is a single-threaded screw.

Figure 23:
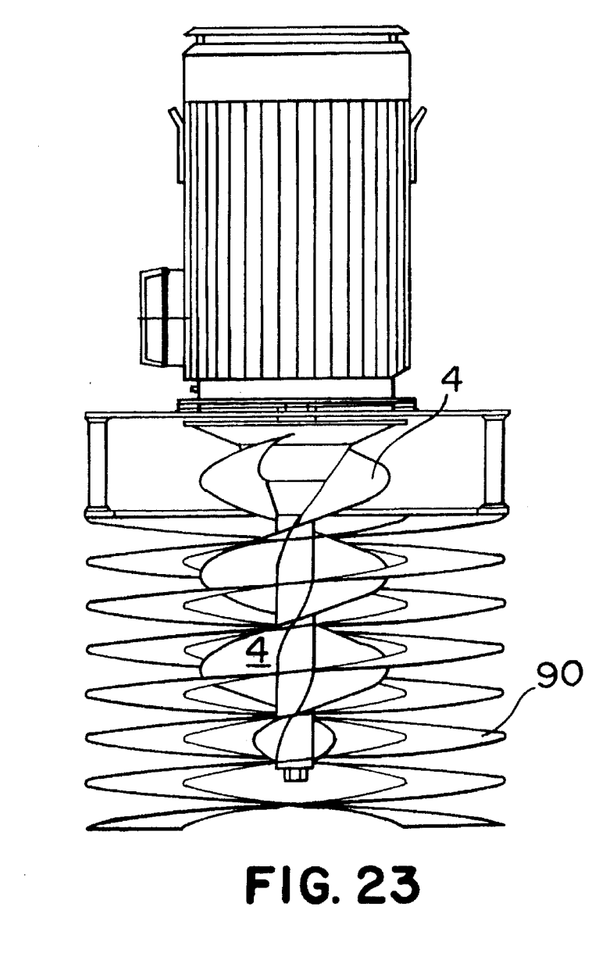

FIG. 23 shows a device with a double-threaded, screw-shaped guide 90 round the centrifugal screw impeller 4, for an aerator without pump housing.

Figure 24:
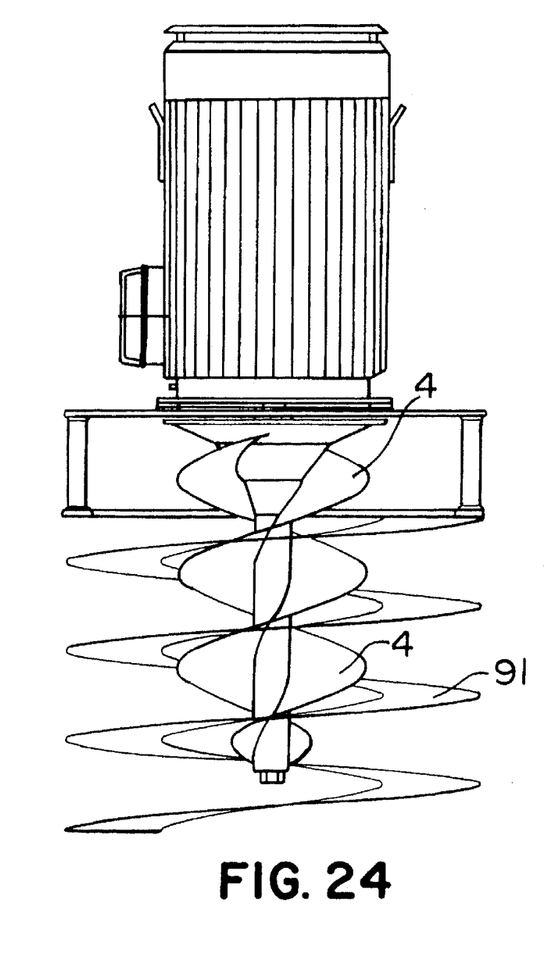

FIG. 24 is a variant of FIG. 23, in which the guide 91 is a single-threaded screw.

Figure 25A:
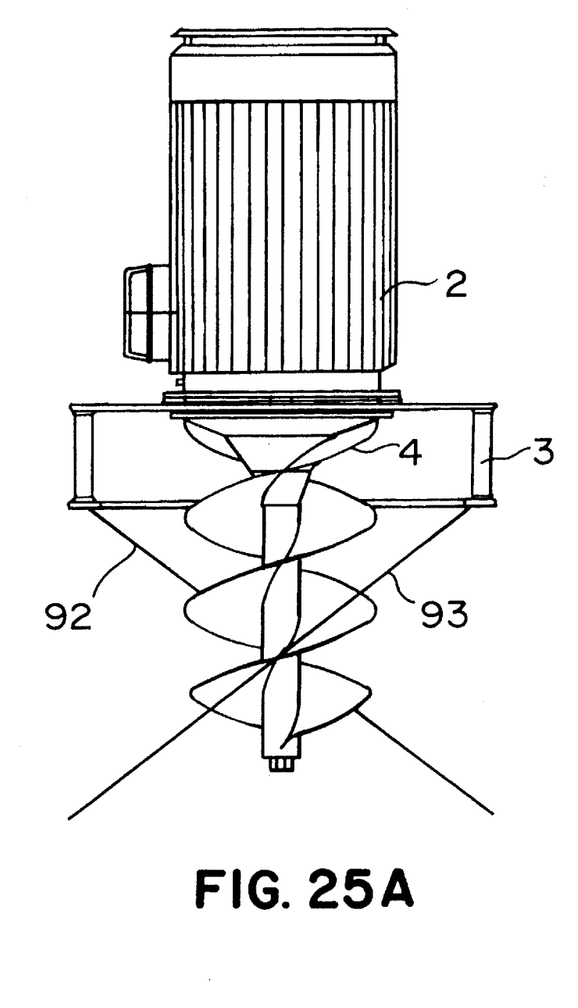
FIGS. 25: front and side elevations of a further variant of an aerator without pump housing, with plate-shaped guide.
Figure 25B:
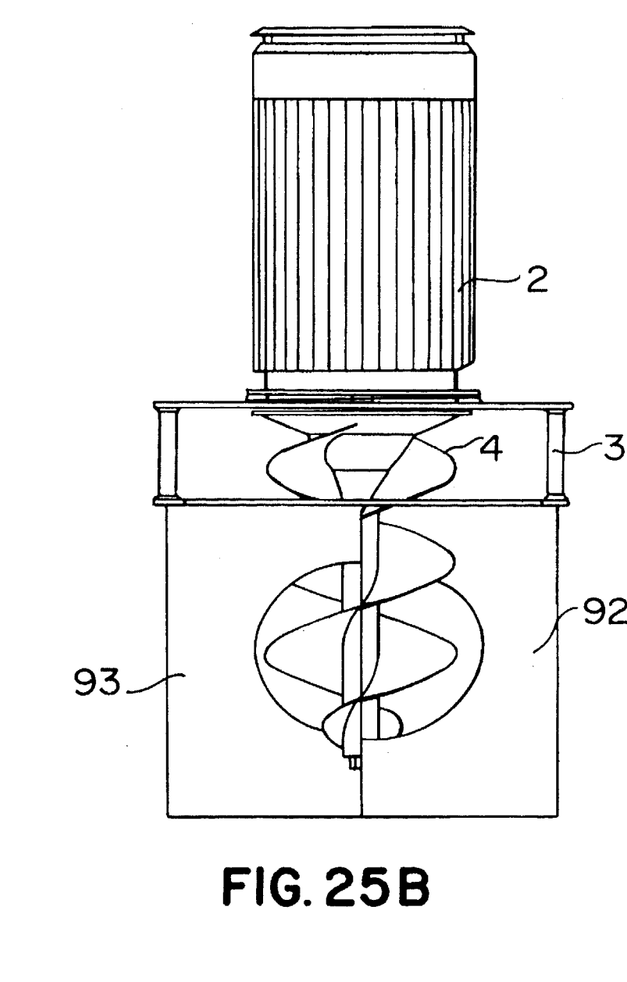

FIGS. 25 show a device without pump housing, in which the guides are flat plates 92 and 93, mounted underneath the intervening flange 3, round the centrifugal screw impeller, at the same angle to the axis of the centrifugal screw impeller 4 but opposite each other. FIG. 25a shows a front view and FIG. 25b a side view.

Further examples can consist of possible combinations of the examples described above.

These examples show that a man skilled in the art has plenty of possibilities, both as regards screw-shaped guides and as regards plate-shaped guide elements. Both the shape of the plates and their number can vary.

It may also be possible to fit additional guide means on the bottom and on the walls of the basin.

What is important is to choose the shape and the position so that the horizontal or vertical direction of rotation of the water in the basin is combined to obtain a waltzing or roller motion.

Clearly, the invention can be applied to any device that is used as an aerator or, by changing the direction of rotation of the motor, can be used as a mixer, or to any device which—as mentioned under prior art—may be used either as aerator or as mixer.

I claim:

1. Device for aerating water in a basin, the water being filled to a desired water level, comprising a motor placed above the water level and driving an impeller which imparts a rotational motion to the water, and plate shaped guide means being arranged on the device, cooperating with said basin, so as to convert the rotational motion of the water into a combined horizontal and vertical motion of the water, said combined horizontal and vertical motion of the water being formed as a toroidal helix.

2. Device according to claim 1, characterised in that the guide means are screw-shaped elements (57–59).

3. Device according to claim 1, further comprising a pump housing surrounding at least partly the impeller a suction cone disposed underneath the pump housing, wherein the plate shaped guide means are arranged at least partly on the suction cone.

4. Device according to claim 3, wherein the plate shaped guide means are placed at least partly underneath of the suction cone.

5. Device according to claim 12, in which the plate shaped guide means are screw shaped elements.

6. Device according to claim 3, in which the plate shaped guide means are screw shaped elements.

7. Device according to claim 6, in which the plate shaped guide means are screw shaped elements.

8. Device according to claim 3, having a pump housing (5), an impeller (4) and a suction cone (6), characterised in that the guide means are mounted on the device at least partly inside the suction cone.

9. Device according to claim 1, having an impeller (4), a pump housing (5) and a suction cone having a central axis (6), characterised in that the plate-shaped elements are flat plates, placed at least partly underneath the suction cone, and placed at the same angle with respect to the axis of the cone.

10. Device according to claim 1, having a centrifugal screw impeller (4) characterised in that the guide elements (91, 92, 93, 94) are placed at least partly round the centrifugal screw impeller (4).

11. Method for aerating water in a basin, the water being filled to a desired water level, with the help of a device comprising placing a motor above the water level and driving an impeller, the impeller imparting a rotational motion to the water, plate-shaped guide means arranged on the device, and cooperating with said basin, said device converting the rotational motion of the water into a combined horizontal and vertical motion of the water, said combined horizontal and vertical motion of the water being formed as a toroidal helix.

12. Device according to claim 1, further comprising a pump housing surrounding at least partly the impeller, wherein the plate shaped guide means are arranged at least partly on the pump housing.

13. Device according to claim 4, in which the plate shaped guide means are screw shaped elements.

14. Device according to claim 3, wherein the plate shaped guide means are placed at least partly inside the suction cone.

15. Device according to claim 1, in which the plate shaped guide means are screw shaped elements.

* * * * *

UNITED STATES PATENT AND TRADEMARK OFFICE
CERTIFICATE OF CORRECTION

PATENT NO. : 5,564,828
DATED : October 15, 1996
INVENTOR(S) : Haegeman

It is certified that error appears in the above-indentified patent and that said Letters Patent is hereby corrected as shown below:

Title Page under the heading "FOREIGN APPLICATION PRIORITY DATA", item [30],

" [DE] Germany " should read -- [BE] Belgium --

In column 4, line 66, " impeller a " should read -- impeller, a --

Signed and Sealed this

Fourth Day of February, 1997

Attest:

BRUCE LEHMAN

Attesting Officer

Commissioner of Patents and Trademarks